US012592149B2

(12) United States Patent
Stenneth et al.

(10) Patent No.: US 12,592,149 B2
(45) Date of Patent: Mar. 31, 2026

(54) METHOD, APPARATUS, AND SYSTEM FOR DETERMINING A BICYCLE LANE DEVIATION FOR AUTONOMOUS VEHICLE OPERATION

(71) Applicant: HERE Global B.V., Eindhoven (NL)

(72) Inventors: Leon Stenneth, Chicago, IL (US); Amarnath Nayak, Mumbai (IN); Alex Averbuch, Buffalo Grove, IL (US); Advait Mohan Raut, Virar West (IN); Bruce Bernhardt, Wauconda, IL (US)

(73) Assignee: HERE GLOBAL B.V., Eindhoven (NL)

( * ) Notice: Subject to any disclaimer, the term of this patent is extended or adjusted under 35 U.S.C. 154(b) by 515 days.

(21) Appl. No.: 17/564,944

(22) Filed: Dec. 29, 2021

(65) Prior Publication Data

US 2023/0206767 A1 Jun. 29, 2023

(51) Int. Cl.
*G08G 1/16* (2006.01)
*B60W 60/00* (2020.01)
*G01C 21/30* (2006.01)

(52) U.S. Cl.
CPC ......... *G08G 1/166* (2013.01); *B60W 60/0015* (2020.02); *G08G 1/167* (2013.01);
(Continued)

(58) Field of Classification Search
CPC ...... G08G 1/166; G08G 1/167; G08G 1/0133; B60W 60/0015; B60W 2552/10;
(Continued)

(56) References Cited

U.S. PATENT DOCUMENTS 8,884,782 B2 11/2014 Rubin et al.
9,014,905 B1 4/2015 Kretzschmar et al.
(Continued)

FOREIGN PATENT DOCUMENTS

CN 112015842 A 12/2020
GB 2562706 A 11/2018
(Continued)

OTHER PUBLICATIONS

Machine Translation of Hamada's reference (JP-2019168607-A) (Year: 2019).*

(Continued)

*Primary Examiner* — Tarek Elarabi

(57) ABSTRACT

An approach is provided for determining bicycle lane deviations for autonomous vehicle warning or operation. The approach, for example, involves retrieving probe data associated with a bicycle transportation mode. The approach also involves determining a plurality of probe points of the probe data that are map-matched outside of a bicycle lane. The approach further involves clustering the plurality of probe points into at least one location cluster. The approach further involves storing the one or more location clusters in a geographic database as respective one or more hazard areas where a plurality of bicycles deviates outside of the bicycle lane. By way of example, the approach can further involve using the at least one location cluster to perform at least one of providing a warning message or determining a driving parameter for an autonomous vehicle.

20 Claims, 14 Drawing Sheets

(52) U.S. Cl.
CPC ..... *B60W 2552/10* (2020.02); *B60W 2552/50* (2020.02); *B60W 2554/4026* (2020.02); *B60W 2554/4041* (2020.02); *B60W 2720/10* (2013.01); *G01C 21/30* (2013.01)

(58) Field of Classification Search
CPC . B60W 2554/4026; B60W 2554/4041; B60W 2720/10; G01C 21/30
See application file for complete search history.

(56) References Cited

U.S. PATENT DOCUMENTS

| | | | |
|---|---|---|---|
| 10,816,993 B1 | 10/2020 | Tran | |
| 2013/0278443 A1* | 10/2013 | Rubin | G08G 1/096791 |
| | | | 340/905 |
| 2015/0179066 A1* | 6/2015 | Rider | G08G 1/04 |
| | | | 701/31.5 |
| 2018/0072313 A1* | 3/2018 | Stenneth | G01S 17/89 |
| 2020/0180647 A1 | 6/2020 | Anthony | |

| | | | |
|---|---|---|---|
| 2023/0196908 A1* | 6/2023 | Beaurepaire | G06V 20/58 |
| | | | 701/117 |
| 2023/0278544 A1* | 9/2023 | Wendt | B60W 30/08 |
| | | | 701/1 |

FOREIGN PATENT DOCUMENTS

| | | | | |
|---|---|---|---|---|
| JP | 2017062583 A | * | 3/2017 | |
| JP | 2019168607 A | * | 10/2019 | |

OTHER PUBLICATIONS

Machine Translation of Koide's reference (JP-2017062583-A) (Year: 2017).*
Stenneth et al., "Transportation mode detection using mobile phones and GIS information", Research-Article, GIS 11: Proceedings of the 19th ACM SIGSPATIAL International Conference on Advances in Geographic Information Systems, Nov. 1, 2011, pp. 54-63.
Parkin et al., "Understanding interactions between autonomous vehicles and other road users", A Literature Review. Project Report, Jun. 2016, 68 pages.

* cited by examiner

300

301 — RETRIEVE PROBE DATA ASSOCIATED WITH BICYCLE TRANSPORTATION MODE

303 — DETERMINE PROBE POINTS MAP-MATCHED OUTSIDE OF BICYCLE LANE

305 — CLUSTER PROBE POINTS INTO LOCATION CUSTER(S)

307 — STORE LOCATION CLUSTER(S) AS HAZARD AREAS

FIG. 7

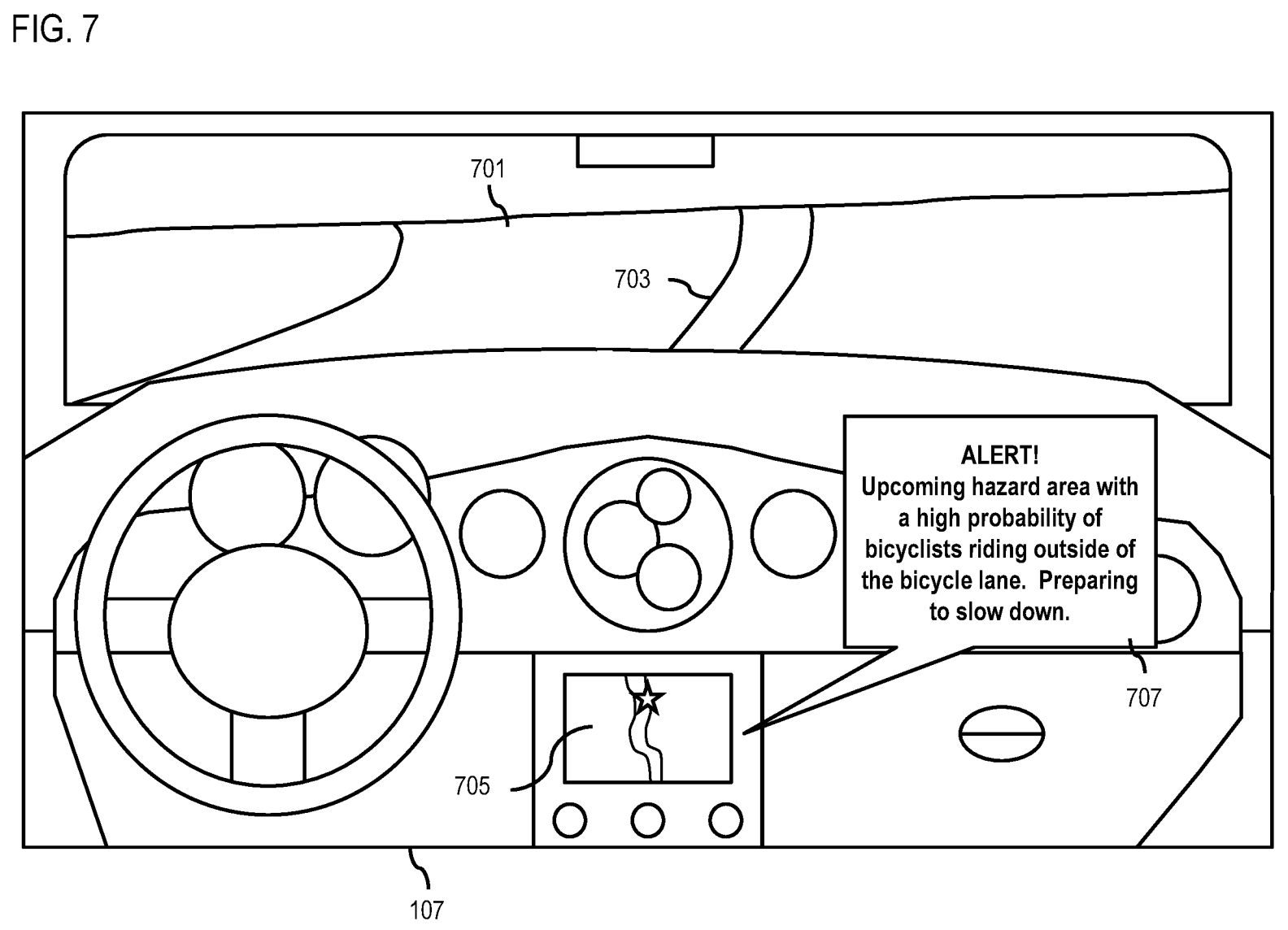

ALERT!
Upcoming hazard area with a high probability of bicyclists riding outside of the bicycle lane. Preparing to slow down.

901

NODE DATA RECORDS 1003

ROAD SEGMENT DATA RECORDS 1005

POI DATA RECORDS 1007

BICYCLE LANE DEVIATION DATA RECORDS 1009

HD DATA RECORDS 1011

INDEXES 1013

GEOGRAPHIC DATABASE 117

GEOGRAPHIC DATA 1001

1200

METHOD, APPARATUS, AND SYSTEM FOR DETERMINING A BICYCLE LANE DEVIATION FOR AUTONOMOUS VEHICLE OPERATION

BACKGROUND

Providing environmental awareness for vehicle safety, particularly in autonomous driving, has been a primary concern for automobile manufacturers and related service providers. For example, as autonomous vehicles become more common, they are also more likely to encounter potentially hazardous conditions when sharing a road with bicyclists particularly when bicyclists are riding outside of bicycle lanes or when there are not bicycle lanes on a road. Accordingly, service providers face significant technical challenges to enabling autonomous vehicles to operate as safely as possible when in such situations.

SOME EXAMPLE EMBODIMENTS

Therefore, there is a need for identifying and mapping bicycle lane deviations for autonomous vehicle operation and/or warning.

According to one embodiment, a method comprises retrieving probe data associated with a bicycle transportation mode. The method also comprises determining a plurality of probe points of the probe data that are map-matched outside of a bicycle lane. The method further comprises clustering the plurality of probe points into at least one location cluster. The method further comprises storing the one or more location clusters in a geographic database as respective one or more hazard areas where a plurality of bicycles deviates outside of the bicycle lane. The method can further comprise using the at least one location cluster to perform at least one of providing a warning message and/or determining a driving parameter for an autonomous vehicle.

According to another embodiment, an apparatus comprises at least one processor, and at least one memory including computer program code for one or more computer programs, the at least one memory and the computer program code configured to, with the at least one processor, cause, at least in part, the apparatus to retrieve probe data associated with a bicycle transportation mode. The apparatus is also caused to determine a plurality of probe points of the probe data that are map-matched outside of a bicycle lane. The apparatus is further caused to cluster the plurality of probe points into at least one location cluster. The apparatus is further caused to store the one or more location clusters in a geographic database as respective one or more hazard areas where a plurality of bicycles deviates outside of the bicycle lane. The apparatus can be further caused to use the at least one location cluster to perform at least one of providing a warning message and/or determining a driving parameter for an autonomous vehicle.

According to another embodiment, a non-transitory computer-readable storage medium carries one or more sequences of one or more instructions which, when executed by one or more processors, cause, at least in part, an apparatus to retrieve probe data associated with a bicycle transportation mode. The apparatus is also caused to determine a plurality of probe points of the probe data that are map-matched outside of a bicycle lane. The apparatus is further caused to cluster the plurality of probe points into at least one location cluster. The apparatus is further caused to store the one or more location clusters in a geographic database as respective one or more hazard areas where a plurality of bicycles deviates outside of the bicycle lane. The apparatus can be further caused to use the at least one location cluster to perform at least one of providing a warning message and/or determining a driving parameter for an autonomous vehicle.

In addition, for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for retrieving probe data associated with a bicycle transportation mode. The apparatus also comprises means for determining a plurality of probe points of the probe data that are map-matched outside of a bicycle lane. The apparatus further comprises means for clustering the plurality of probe points into at least one location cluster. The apparatus further comprises means for storing the one or more location clusters in a geographic database as respective one or more hazard areas where a plurality of bicycles deviates outside of the bicycle lane. The apparatus can further comprise means for using the at least one location cluster to perform at least one of providing a warning message and/or determining a driving parameter for an autonomous vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a diagram illustrating an example of autonomous vehicle reacting to bicycle lane deviation clusters, according to one embodiment;

DESCRIPTION OF SOME EMBODIMENTS

Examples of a method, apparatus, and computer program for determining bicycle lane deviations for autonomous vehicle operation or warning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
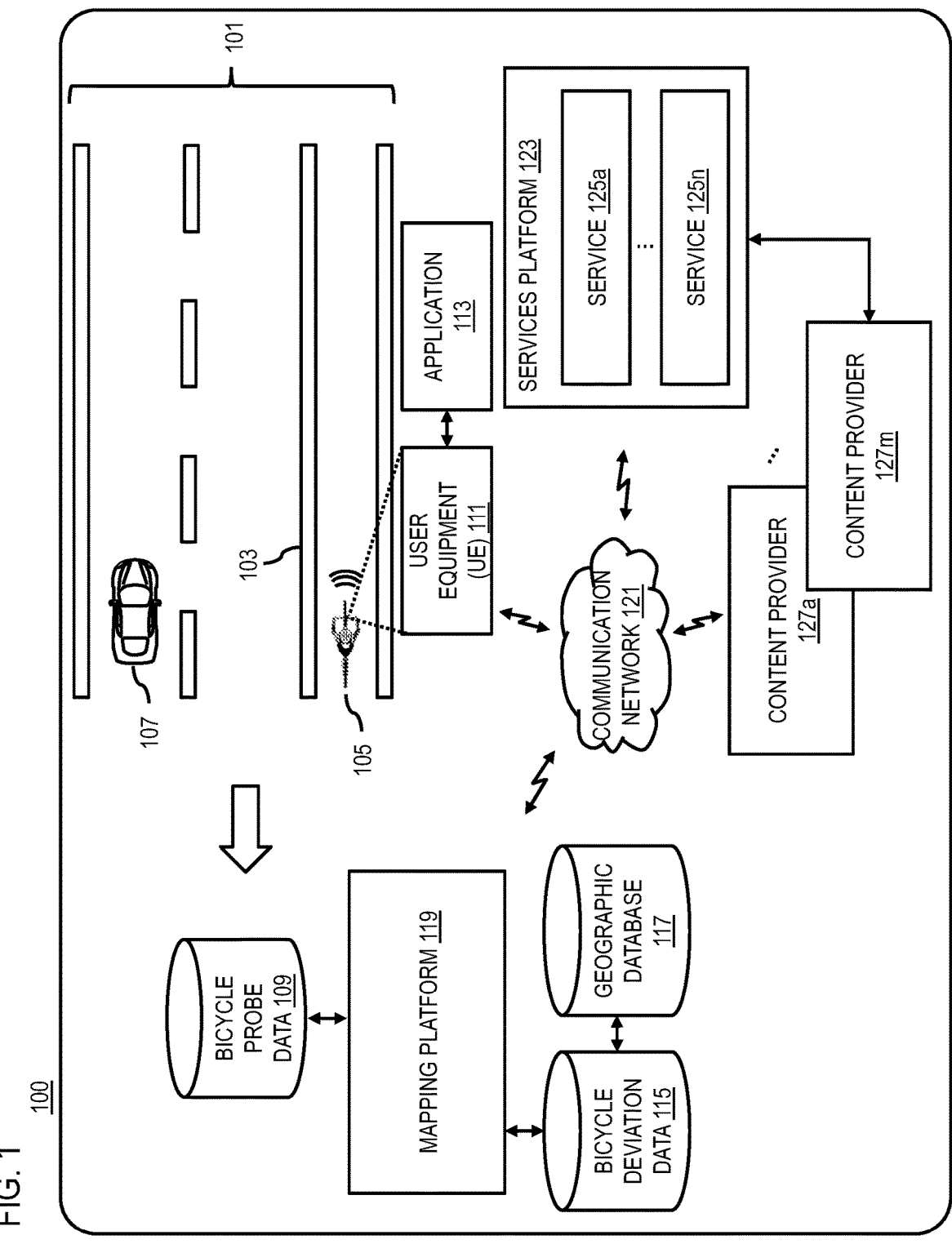
FIG. 1 is a diagram of a system capable of determining bicycle lane deviations, according to one embodiment.

FIG. 1 is a diagram of a system 100 capable of determining bicycle lane deviations, according to one embodiment. Many roads (e.g., road 101) support both vehicular traffic on vehicle travel lanes and bicycle traffic have separate bicycle lanes (e.g., bicycle lane 103 both marked (as shown) or unmarked). Bicycle lanes 103 are generally carved at the edge of the road 101. Some roads do not have dedicated bicycle lanes 103 at all, but the bicycle traffic is not prohibited, and these roads are actively used by bicyclists, especially in summertime. Although the creation of a separate bicycle lane 103 can increase safety for bicyclists (e.g., rider of bicycle 105) can result in increased safety for bicyclists, there usually is not physical barrier between vehicular traffic and bicycle traffic and potential hazards remain. For example, if there is a significant number of bicyclists riding outside the bicycle lane 103 (at any particular location) or on a road where there is no bicycle lane 103, then this may pose a challenge or other potential hazard particularly to an autonomous vehicle (AV) 107. For example, AVs 107 generally use lane level guidance to drive autonomously, and if bicyclist deviate from their bicycle lanes 103 (e.g., by riding outside of the lane or on roads with no designated bicycle lanes 103), there are significant technical challenges with respect to determining how AVs 107 should respond to drive safely and avoid potential accidents with the bicyclists.

By way of example, AVs 107 generally work and operate well with minimum hazards. In this particular case, at spots where there are excessive numbers of bicyclists deviating from the bicycle lane 103, or there is no bicycle lane 103 at all, AVs 107 may find it technically challenging to maneuver at the last minute. Therefore, it will be helpful for the AV 107 to have this information on such potential hazards beforehand so that the AV 107 can take the corrective action in advance. In addition, as mentioned, there are many roads that do not have bicycle lanes 103 at all, but where bicycles are allowed. Some of those roads have paved shoulders wide enough to ride bicycles 105 or otherwise bicyclists will ride in the vehicle lanes. This can create the same technical challenges for AVs 107.

To address these technical challenges, the system 100 of FIG. 1 introduces a capability to collect probe data 109 from bicycles 105 (or from user equipment (UE) devices 111 executing applications 113 that are carried or otherwise associated with the bicycles 105) to create clusters of these deviations clusters of these deviations (e.g., bicycle deviation data 115) after map matching (e.g., to digital map data of a geographic database 117 of a mapping platform 119) and then warn upcoming AVs 107 about these deviation clusters. The geographic database 117 has map data indicating bicycle lane locations and/or road lanes that allow bicycle traffic even if there are no lanes. By using a lane level map matcher of bicycle coordinates (e.g., indicated in the collected bicycle probe data 109) on the lane level map data of the geographic database 117, the system 100 can determine when a bicycle 105 deviates from the bicycle lane 103 and map those deviations according to the embodiments described herein. In addition, there are some traffic laws and regulations on passing bicycles 105, and those laws are different across states and countries. AVs 107 will then have to comply with such laws (if not more strict ones), and the various embodiments described herein for determining and mapping bicycle lane deviations can help to do so.

In summary, the various embodiments described herein provide an approach for identifying bicycle lane deviations (e.g., bicycle deviation data 115) and providing warnings, autonomous driving instructions, and/or the like for AVs 107 to operate more safely at locations where bicyclists share the road. In one embodiment, the system 100 creates clusters of bicycle lane deviations (e.g., bicycle deviation data 115) after map matching and then warn upcoming AVs 107 about these deviation clusters. For cyclists riding outside of bicycle lanes 103, the system 100 models their locations (e.g., GPS positions or equivalent) to map match outside of the bicycle lane using a lane level map matcher and clusters the bicyclist geocoordinates (e.g., GPS positions). bicycles that are riding outside of the bicycle lanes 103 are clustered after map matching.

In one embodiment, the system 100 provides the bicycle deviation data 115 to AVs 107 (or any other component or user of the mapping platform 119) beforehand so that AVs 107 can take the corrective action in advance to operate more safely. In one embodiment, to collect the bicycle probe data 109, the system 100 utilizes historical probe points and runs a transportation mode detection to distinguish bicycle transportation mode from pedestrians and other motorized modes of transportation such as cars. Further, the system 100 performs lane level map matching or the bicycle probe data 109 to select only those probe points that are located outside of the bicycle lane 103. The system 100 then cluster all the selected probe points (e.g., probe points from bicycles 105 that are outside of the bicycle lane 103) to determine the areas where multiple bicycles 105 are not staying in the bicycle lane 103 and uses these bicycle lane deviation clusters (e.g., bicycle deviation data 115) to warn or otherwise operate AVs 107 more safely.

In other words, the bicycle deviation data 115 (e.g., mapped hazard areas corresponding to the locations of probe point clusters that are outside of bicycle lanes 103) can then be used in real time to support autonomous driving applications traversing roads 101 that have both vehicular and bicycle traffic. By way of example, in SAE's autonomy level definitions, there are six levels of driving automation from 0 to 5 shown as below.

Level 0: Automated system issues warnings and may momentarily intervene but has no sustained vehicle control.

Level 1 ("hands on"): The driver and the automated system share control of the vehicle. Examples are Adaptive Cruise Control (ACC), where the driver controls steering and the automated system controls speed; and Parking Assistance, where steering is automated while speed is manual. The driver must be ready to retake full control at any time. Lane Keeping Assistance (LKA) Type II is a further example of level 1 self-driving.

Level 2 ("hands off"): The automated system takes full control of the vehicle (accelerating, braking, and steering). The driver must monitor the driving and be prepared to intervene immediately at any time if the automated system fails to respond properly. The shorthand "hands off" is not meant to be taken literally. In fact, contact between hand and wheel is often mandatory during SAE 2 driving, to confirm that the driver is ready to intervene.

Level 3 ("eyes off"): The driver can safely turn their attention away from the driving tasks, e.g., the driver can text or watch a movie. The vehicle will handle situations that call for an immediate response, like emergency braking. The driver must still be prepared to intervene within some limited time, specified by the manufacturer, when called upon by the vehicle to do so. The 2018 Audi A8 Luxury Sedan was the first commercial car to claim to be capable of level 3 self-driving. The car has a so-called Traffic Jam Pilot. When activated by the human driver, the car takes full control of all aspects of driving in slow-moving traffic at up to 60 kilometers per hour. The function works only on highways with a physical barrier separating one stream of traffic from oncoming traffic.

Level 4 ("mind off"): As level 3, but no driver attention is ever required for safety, i.e., the driver may safely go to sleep or leave the driver's seat. Self-driving is supported only in limited spatial areas (geofenced) or under special circumstances, like traffic jams. Outside of these areas or circumstances, the vehicle must be able to safely abort the trip, i.e., park the car, if the driver does not retake control.

Level 5 ("steering wheel optional"): No human intervention is required. An example would be a robotic taxi.

As described above, a level 4 vehicle would be driverless in most scenarios and level 5 vehicle is fully non-human involved vehicles. It is contemplated that the various embodiments described herein are applicable to any of the levels described above.

In addition to autonomous driving applications, it is contemplated that the mapping platform 119 can output the bicycle deviation data 115 (e.g., over a communication network 121) to support any application and/or service that can use the bicycle deviation data 115 to perform a function. Examples of the applications and/or services include applications provided by a services platform 123, one or more services 125a-125n (also collectively referred to as service 125), one or more content providers 127a-127m (also collectively referred to as content providers 127), and/or the like.

Figure 2:
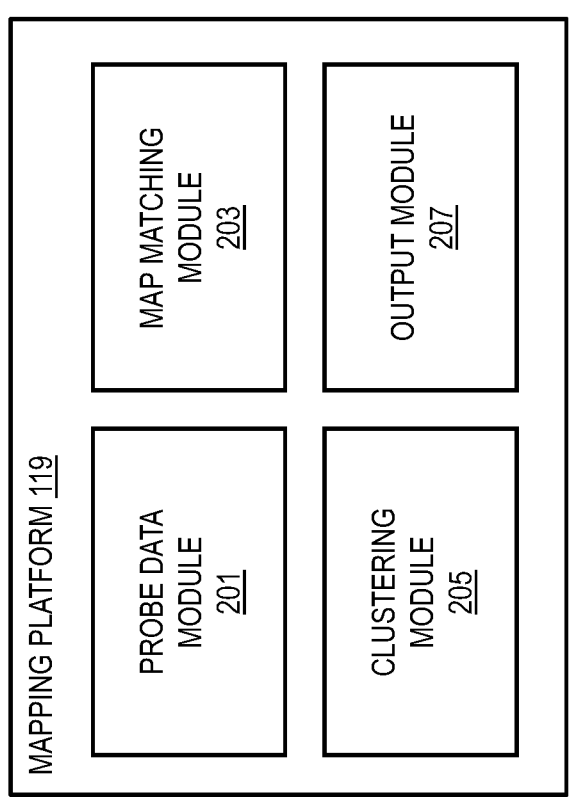
FIG. 2 is a diagram of the components of mapping platform capable of determining bicycle lane deviations, according to one embodiment.

FIG. 2 is a diagram of the components of mapping platform capable of determining bicycle lane deviations, according to one embodiment. In one embodiment, as shown in FIG. 2, the mapping platform 119 of the system 100 includes one or more components for determining a bicycle deviation data 115 according to the various embodiments described herein. It is contemplated that the functions of the components of the mapping platform 119 may be combined or performed by other components of equivalent functionality. As shown, in one embodiment, the mapping platform 119 includes a probe data module 201, a map matching module 203, a clustering module 205, and an output module 2307. The above presented modules and components of the mapping platform 119 can be implemented in hardware, firmware, software, or a combination thereof. Though depicted as a separate entity in FIG. 1, it is contemplated that the mapping platform 119 may be implemented as a module of any of the components of the system 100 (e.g., a component of the services platform 123, services 125, content providers 127, vehicles 107, UEs 111, applications 113, and/or the like). In another embodiment, one or more of the modules 201-207 may be implemented as a cloud-based service, local service, native application, or combination thereof. The functions of the mapping platform 119 and modules 201-207 are discussed with respect to figures below.

Figure 3:
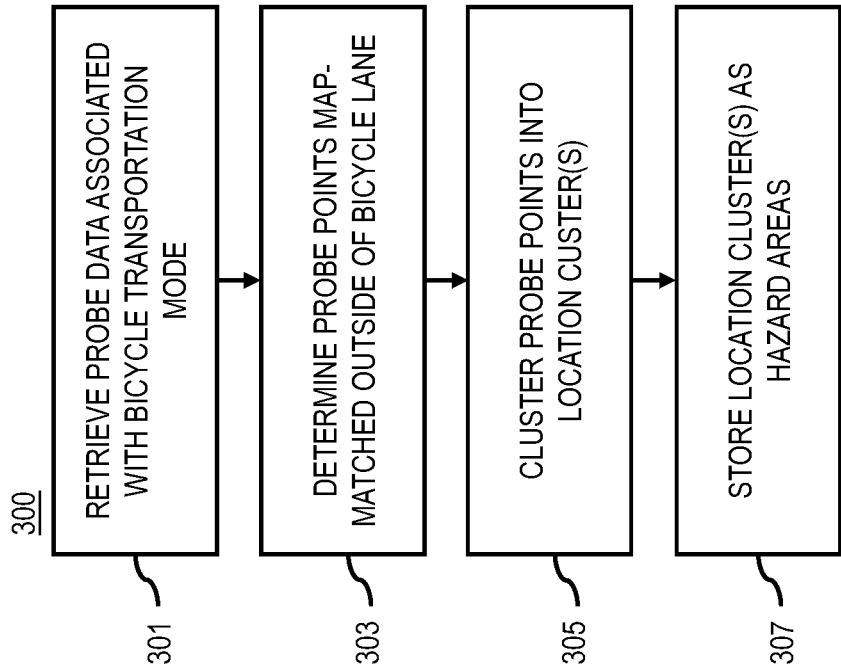
FIG. 3 is a flowchart of a process for determining bicycle lane deviations, according to one embodiment.
Figure 12:
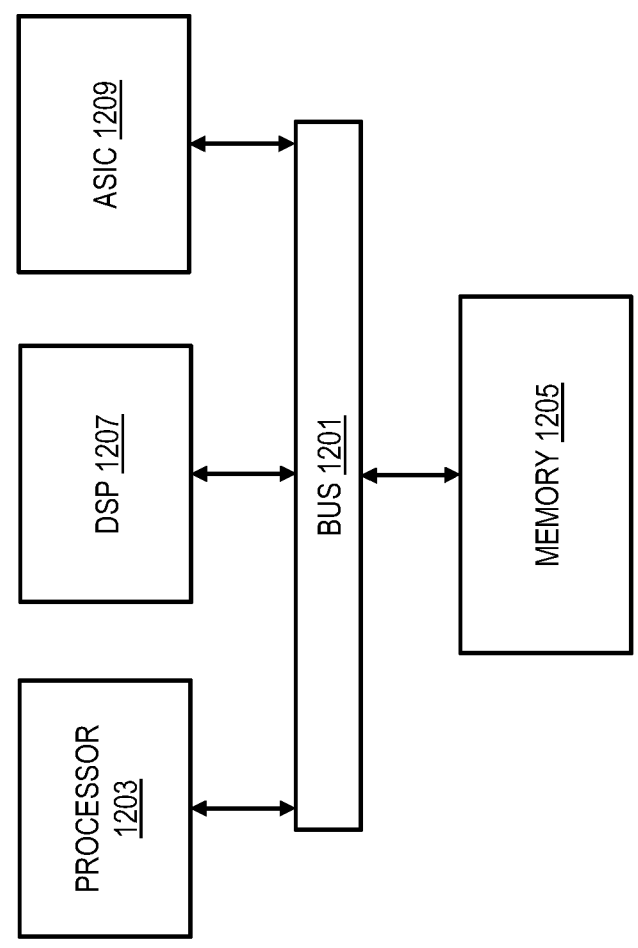
FIG. 12 is a diagram of a chip set that can be used to implement an embodiment.

FIG. 3 is a flowchart of a process for determining bicycle lane deviations, according to one embodiment. In various embodiments, the mapping platform 119 and/or any of the modules 201-207 may perform one or more portions of the process 300 and may be implemented in, for instance, a chip set including a processor and a memory as shown in FIG. 12. As such, the mapping platform 119 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the probe data module 201 retrieves probe data associated with a bicycle transportation mode (e.g., bicycle probe data 109). As used herein, probe data refers to a collection of probes/probe points comprising a probe identifier (e.g., to uniquely identify the devices, vehicles, bicycles 105, or associated UEs 111 from which the probe data is collected), geolocation (e.g., latitude and longitude determined by a location sensor such as, but not limited to, a satellite-based location receiver, or equivalent), a time-stamp, and optionally additional parameters such as, but not limited to, a speed, heading, and/or the like.

In one embodiment, the probe data module 201 can retrieve historical probe points such as from a probe repository (e.g., a repository of the content provider 127). The historical probe points may be a general collection of probe points that have not been separated according to mode of transportation. As a result, the historical probe points may be from bicycles 105, cars, pedestrians, and/or any other traveler in the road/transportation network. Accordingly, in one embodiment, the probe data module 201 can run transportation mode detection process on the historical probe points to distinguish probe data associated with a bicycle transportation mode from pedestrians and other motorized modes of transportation such as cars. It is contemplated that the probe data module 201 can use any means for separating out bicycle probe data 109 from general historical probe data.

For example, the probe data module 201 can inference models including, but not limited to, Bayesian Net, Decision Tree, Random Forest, Naïve Bayesian, Multilayer Perceptron, or equivalent to classify the transportation modes of probe points. These inference models can use the geocoordinates of probe points and knowledge of the underlying transportation network (e.g., as indicated in the map data of the geographic database 117) to infer the mode of transportation. By way of example, the transportation network information can include, but is not limited to, features associated with the locations/geometries of bicycle lanes 103, real-time vehicle/bicycle locations, spatial public transportation information, and/or the like. The features related to the probe points and underlying transportation system can then be used to classify the probe points to various transportation modes including, but not limited to car, bus, aboveground train, walking, bicycling, and stationary.

In addition or alternatively, the probe data module 201 can retrieve historical probe data from a probe data provider that collects data only from bicycles 105 or has otherwise separated the bicycle probe data 109 from probe data associated transportation modes other than a bicycle transportation mode.

Figure 4:
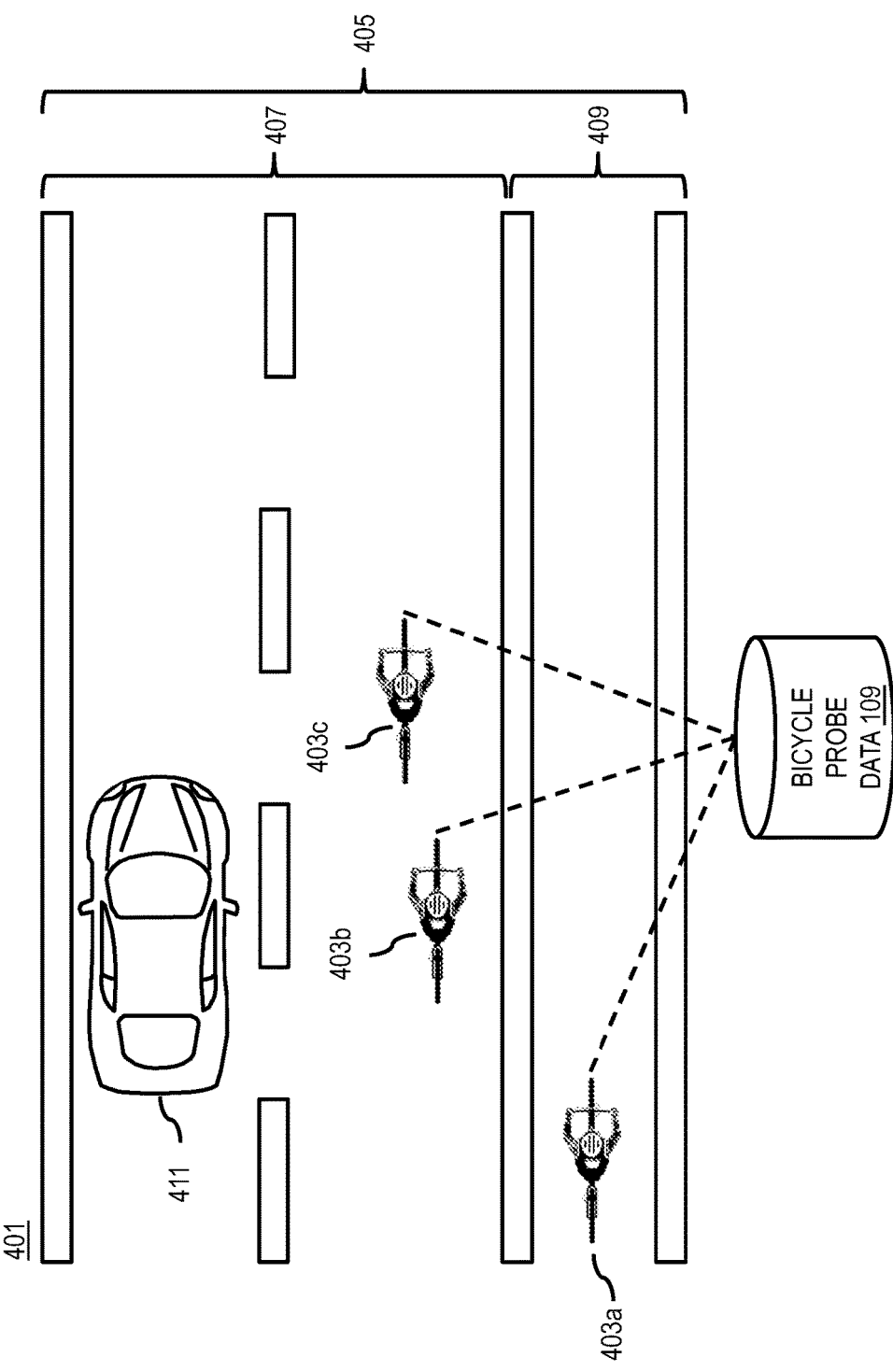
FIG. 4 is diagram illustrating example bicyclists deviating from a bicycle lane, according to one embodiment.

FIG. 4 is diagram illustrating example bicyclists deviating from a bicycle lane, according to one embodiment. As shown, three bicycles 403a-403c are riding on a road 405 that includes both vehicle lanes 407 and a bicycle lane 409. Bicycle 403a is in the bicycle lane 409 and bicycles 403b and 403c are in the vehicle lanes 407. Bicycle probe data 109 can be collected from the bicycles 403a-403b, while excluding the probe data from other road users such as a vehicle 411. In one embodiment, the bicycles 403a-403b can be equipped with location sensors (e.g., satellite-based location sensors such as GPS or equivalent) that can be used to determine probe points at a designated frequency as the bicycles 403a-403c travel on the road 405. In addition or alternatively, the bicycles 403 can associated UEs 111 (e.g., smartphones, personal navigation devices, wearable devices, location trackers, etc.) carried on the bicycles 403a-403c or by their riders. The collected bicycle probe data 109 can be transmitted directly to the mapping platform 119 and/or collected by the content provider 127 (or other equivalent probe data collector) for aggregation and transmission to the mapping platform 119 as historical probe data.

In step 303, the map matching module 203 determines a plurality of probe points of the probe data (e.g., bicycle probe data 109 as collected according to the embodiments of step 301) that are map-matched outside of a bicycle lane 103. In other words, the map matching module 203 can determine which of the collected bicycle probe points are in a bicycle versus outside of a bicycle. The probe points of interest for processing according to the various embodiments described herein are the probe points outside of a bicycle lane 103 because they are probe points that a deviating from a bicycle lane 103.

In one embodiment, the map matching module 203 performs lane level map matching of the probe points to identify the lane of the road in which the corresponding bicycle 105 was traveling when the probe point was collected. Map matching, for instance, refers to translating raw geolocation coordinates (e.g., latitude, longitude) to a position on a road link segment or a lane of the road link stored in the geographic database 117. It is contemplated that the map matching module 203 can use any map matching method known in the art. Thus, the map matching module 203 would use a lane level map (e.g., map data of the geographic database 117) in the map matching process. Thereby, the map matching module 203 can identify the lane of the bicyclists associated with the bicycle probe data 109 and whether they are traveling in the bicycle lane or outside of the bicycle lane. In other words, the digital map data of the geographic database 117 has data records representing or otherwise indicting bicycle lane locations. Then, by using a lane level map matcher of bicycle coordinates of the bicycle probe points on the lane level map of the geographic database 117, the map matching module 203 can determine when a bicycle 105 deviates from the bicycle lane 103.

In one embodiment, if the bicycle 105's probe point is map matched within the bicycle lane 103, then the probe point is fine and not bicycle lane deviation. The probe data point can then be dropped or otherwise excluded from further processing related to determining bicycle lane deviations. On the other hand, if the bicycle 105's probe data is map matched outside of the bicycle lane, the bicycle probe point is tagged as a deviation and archived or selected for further processing.

Figure 5:
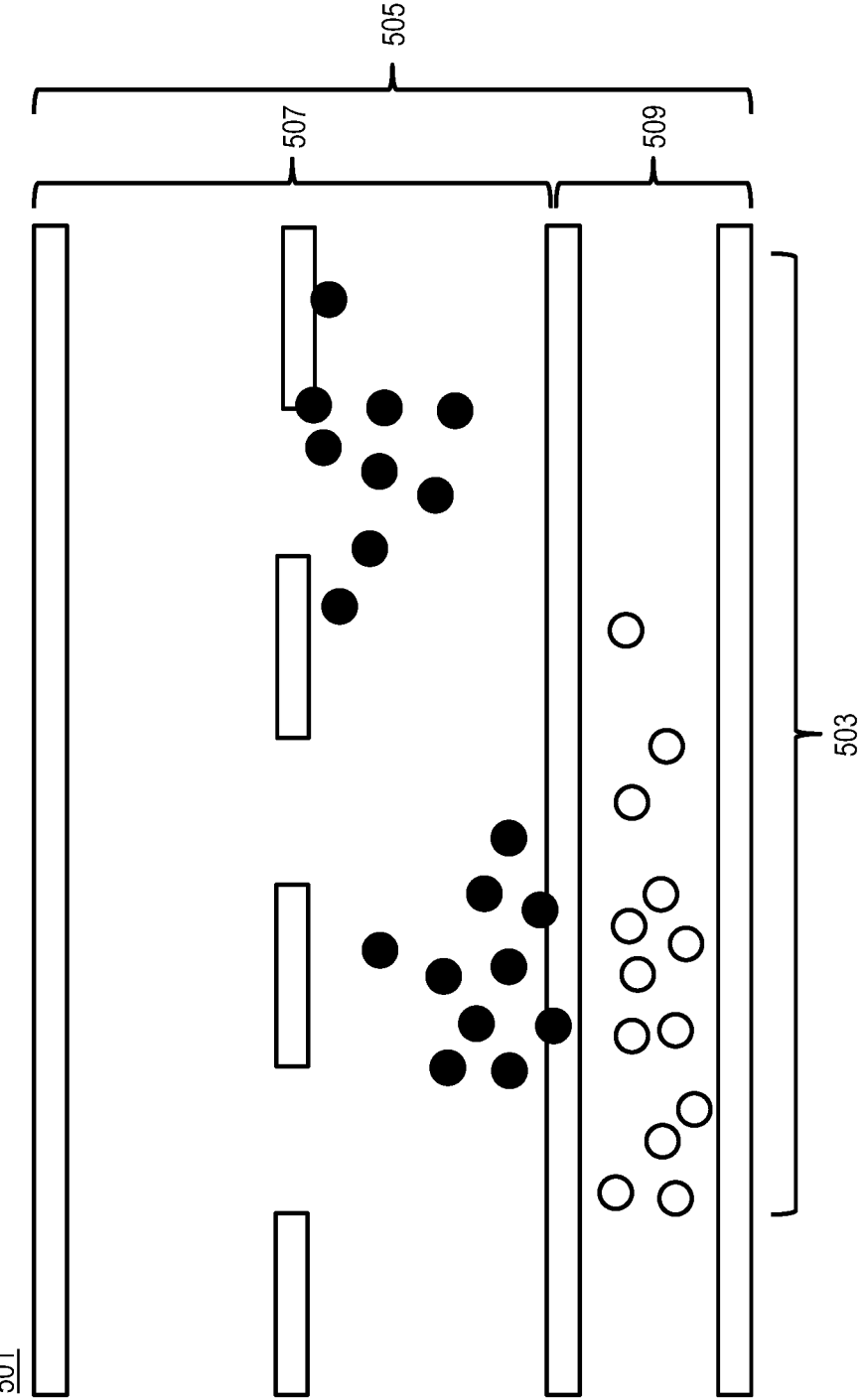
FIG. 5 is a diagram illustrating an example of map matching bicycle probe data to outside or in a bicycle lane, according to one embodiment.

FIG. 5 is a diagram illustrating an example 501 of map matching bicycle probe data 503 to outside or in a bicycle lane, according to one embodiment. As shown, bicycle probe data 503 includes a set of probe points (e.g., represented as circles) collected from a road 505 including both vehicle travel lanes 507 and a bicycle lane 509. Each of the probe points can be map matched at a lane level according to the embodiments described above to determine which lane (e.g., vehicle travel lanes 507 or bicycle lane 509) of the road 505 the probe points are on. In this example, the probe points that are map matched in the bicycle lane 509 are indicated as white circles, and the probe points that are map matched outside of the bicycle lane 509 are indicated as black circles. The probe points that are map matched in the bicycle lane 509 are dropped from further processing and the probe points that are map matched outside the bicycle lane 509 are tagged as a deviation and archived or selected for further processing. In one embodiment, the probe points selected for further processing can be archived from over a designated time period (e.g., probe points from the last 1 year, 3 years, etc.), and then processed according to the embodiments described below.

In step 305, the clustering module 205 clusters the plurality of probe points (e.g., bicycle probe data 109 map matched to outside of the bicycle lane 103) into at least one location cluster (e.g., by clustering the probe points based on the proximity of their geolocations). In other words, for all the archived or selected probe points (e.g., GPS probe points from bicycles 105 that are outside of the bicycle lane 103) determined according to the various embodiments of step 301 and 303, the clustering module 205 can cluster the archived or selected probe points to see the geographic areas where multiple bicycles 105 are not staying in the bicycle lane 103. In one embodiment, the clustering is carried out on the historical bicycle probe data 109 that are retrieved from a designated period of time. For example, the designated period of time can be from the most recent 1 to 3 years. The clustering module 205 can use a sliding window to select the bicycle probe data 109 to process. In this way, the latest data is always selected and included, and the older data removed from the determination of the resulting bicycle deviation data 115.

It is contemplated that any clustering algorithm can be used including but not limited to density-based spatial clustering of applications with noise (DB-SCAN). The DB-SCAN clustering algorithm, for instance, groups probe points that geographically close together such that probe points with many neighboring points are included in the same location cluster. The clustering can be performed based on a specified minimum number of probe points, a specified distance radius, or a combination thereof for each cluster. With respect to the DB-SCAN algorithm, example values for these parameters can include but is not limited to a minimum number of points in each cluster (minPts)=2 and a cluster distance radius (epsilon)=100 m. It is noted that these parameter values are provided by way of illustration and not as limitations.

Figure 6A:
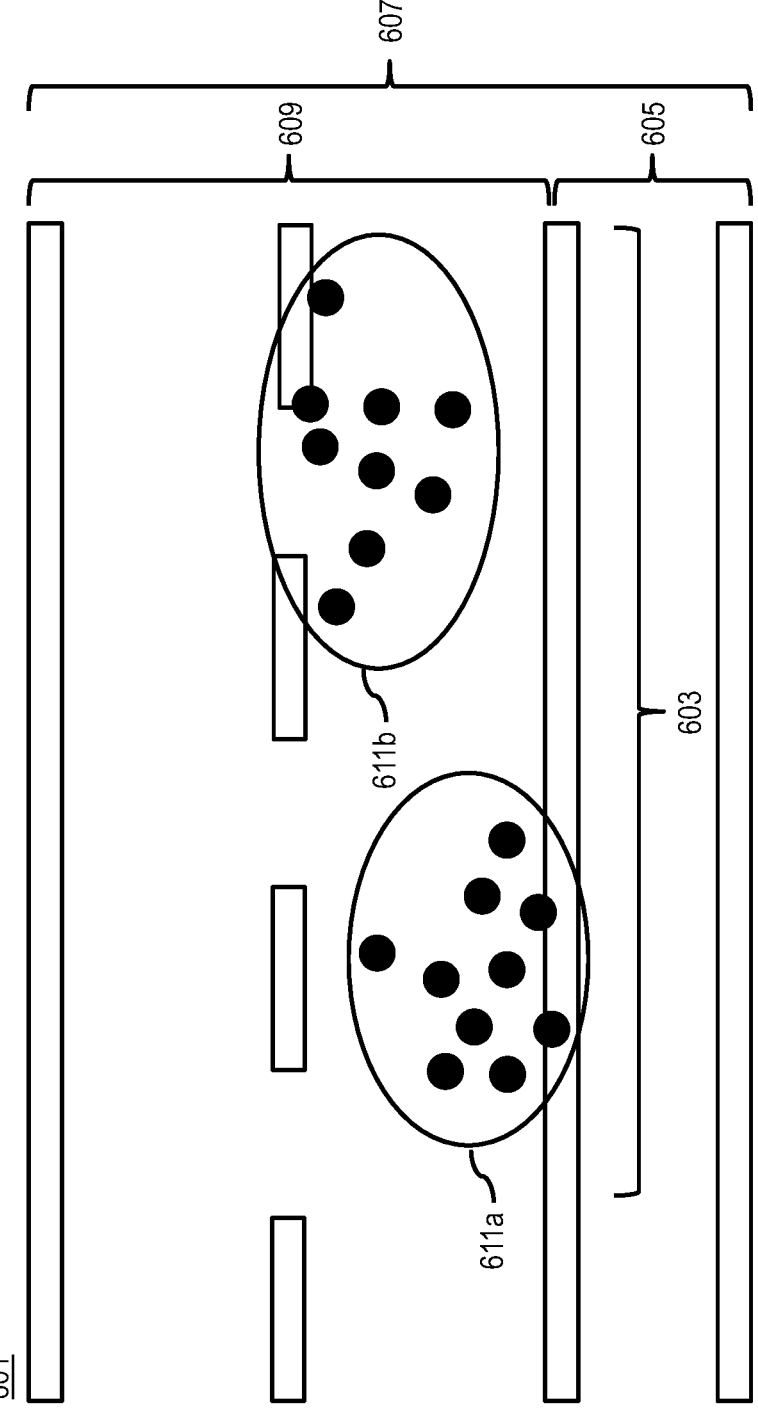
FIGS. 6A and 6B are diagrams illustrating an example of clustering bicycle probe points to determine bicycle lane deviations, according to one embodiment.

FIG. 6A is a diagram illustrating an example 501 of clustering bicycle probe points (e.g., bicycle probe data 109) to determine bicycle lane deviations, according to one embodiment. In this example, bicycle probe points 603 that are outside of a bicycle lane 605 of a road 607 (e.g., located in the vehicle travel lanes 609 of the road 607) are clustered according to the various embodiments described above into a location cluster 611a and a location cluster 611b. The location clusters 611a and 611b represent geographic areas on the road 607 where multiple bicycles 105 deviate from the bicycle lane 605 by riding in the travel lanes 609.

In one embodiment, the clustering module 205 can calculate and utilize a confidence for bicycle deviation such as from 0 to 1 where 0 is low confidence and 1 is high confidence. By way of example, the clustering module 205 can increase the confidence of bicycle deviations in areas where the location cluster is dense and constituent probe points are more recent. In other words, a location cluster containing a larger number of bicycle probe points can be calculated to have a higher confidence than a cluster with fewer probe points. Similarly, a location cluster containing probe points collected from a more recent time period (e.g., the most recent six months) than a location cluster with older probe points (e.g., collected more than six months ago).

In another embodiment, the clustering module 205 can determine a confidence of bicycle deviations based on a location of the at least one location cluster with respect to the bicycle lane. The confidence, for instance, represents a metric of how likely it would be to encounter bicycle deviation when approaching the location cluster or a road segment corresponding to the location cluster. More specifically, the confidence can be based on the distance the location cluster is located in relation to the location of the bicycle lane 103. For example, in this embodiment, the confidence of bicycle deviations of a location cluster can be a categorical value that is set to: (1) a low confidence based on determining there is no location cluster; (2) a medium confidence based on determining that the at least one cluster is located partially within the bicycle lane and partially outside the bicycle lane; (3) a high confidence based on determining that the at least one location cluster is located completely outside the bicycle lane.

Figure 6B:
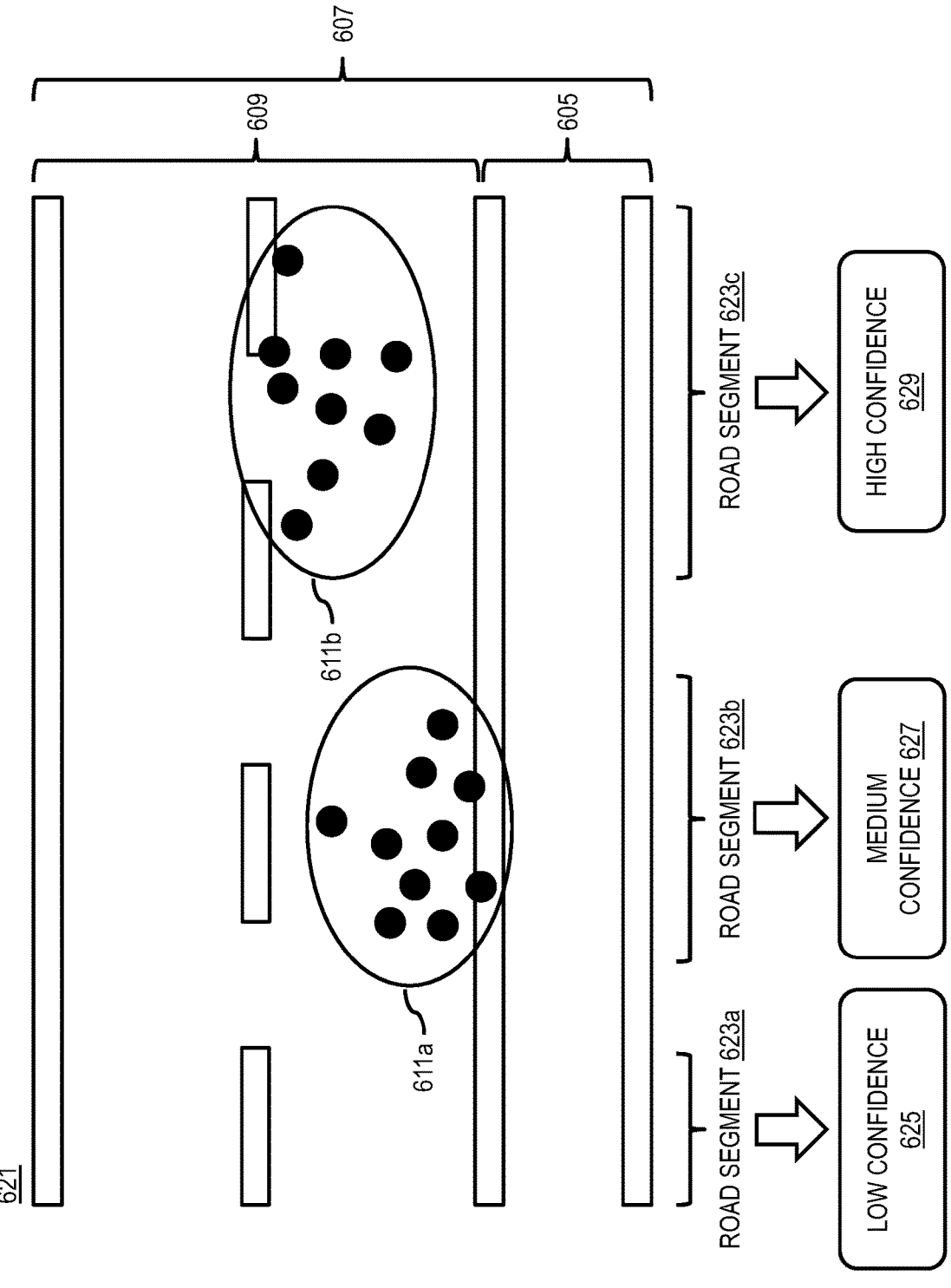

FIG. 6B is a diagram illustrating an example 621 of determining a confidence level for bicycle lane deviation clusters, according to one embodiment. The example 621 of FIG. 6B continues the example 601 of FIG. 6A in which two location clusters 611a and 611b corresponding to geographic areas of bicycle lane deviations have been determined. In this example, road segment 623a is associated with no location clusters of bicycle lane deviations and therefore is assigned a low confidence 625 of having bicycle lane deviations. Road segment 623b corresponds to location cluster 611a which straddles both the bicycle lane 605 and the vehicle travel lanes 609 of the road 607. Therefore, both the road segment 623b and/or the location cluster 611a can be assigned a medium confidence 627. Road segment 623c corresponds to location cluster 611b which is completely outside the bicycle lane 605. Therefore, both the road segment 623c and/or the location cluster 611b can be assigned a high confidence 629.

In step 307, the output module 207 stores the one or more location clusters (e.g., the bicycle deviation data 115) in a geographic database 117 as respective one or more hazard areas where a plurality of bicycles deviates outside of the bicycle lane. In other words, the output module 207 can include the location clusters in the map data records or a map data layer of the geographic database 117. In this way, the bicycle deviation data 115 can be provided to end user of the geographic database 117 including but not limited to the services AVs 107, UEs 111, applications 113, services platform 123, services 125, and/or content providers 127.

In one embodiment, the output module 207 can use the at least one location cluster to perform at least one of: (1) providing a warning message, e.g., to AVs 107, (2) or determining a driving parameter for AVs 107.

For example, the output module 207 can determine an autonomous vehicle driving response to approaching the at least one location cluster or a road segment associated with the at least one location cluster based on the confidence of bicycle deviations assigned to the cluster and/or road segment. In one embodiment, the driving response is to move to another vehicle lane, to reduce vehicle speed, to engage a sensor to detect a bicyclist, or a combination thereof. The specific response of the AV 107 can depend on the confidence of the encountered location cluster and/or attributes of the road associated with the encounter (e.g., number of lanes, presence of a bicycle lane 103, etc.).

Examples of different response options include but are not limited to the responses illustrated in Tables 1-3 below.

TABLE 1

| AV response for multiple lane road with bicycle lane | |
| --- | --- |
| Low Confidence | AV 107 will not take any action and it will drive normally. |
| Medium Confidence | AV 107 will be in the same lane, but it will keep away from the bicycle lane 103. |
| High Confidence | AV 107 will move to the next lane. In addition, a warning or other indication of the high confidence bicycle deviation cluster can be given to the AV 107 at least a designated distance (e.g., 500 m) before the location cluster so that AV 107 has enough time to change lane. |

TABLE 2

| AV response for single lane road with bicycle lane | |
| --- | --- |
| Low Confidence | AV 107 will not take any action and it will drive normally. |
| Medium Confidence | AV 107 will be in the same lane, but it will keep away from the bicycle lane 103. |
| High Confidence | AV 107 will be in the same lane, but it will keep away from the bicycle lane 103. AV 107 will also reduce speed by at least a designated amount (e.g., 25% speed reduction) to have better control. Additional sensors can also be engaged to check for potential nearby cyclists. |

TABLE 3

| AV response for roads without a bicycle lane | |
| --- | --- |
| Low Confidence | AV 107 will not take any action and it will drive normally. |
| Medium Confidence | AV 107 will be in the same lane, but it will notify the user of the AV system that a medium confidence potential exists for bicycles in the upcoming section of road, based on historical data. |
| High Confidence | AV 107 will be in the same lane. AV 107 will also reduce speed by at least a designated amount (e.g., 25% speed reduction) to have better control. Additional sensors can also be engaged to check for potential nearby cyclists. |

FIG. 7 is a diagram illustrating an example of autonomous vehicle reacting to bicycle lane deviation clusters, according to one embodiment. In this example, an AV 107 is driving on a road segment 701 with a bicycle lane 703. Its navigation system 705 is configured with map data of the geographic database 117 that includes the bicycle deviation data 115. As the AV 107 drives, the navigation system 705 determines that an upcoming segment of the road 701 has been mapped to include a bicycle lane deviation cluster with a high confidence indicating that there is high probability of encountering bicyclists who are riding outside of the bicycle lane 703. In response, the AV 107 plans to slow down by 25% because the road 701 has only one lane, and there is no other lane for the AV 107 to avoid potential bicyclists. The navigation system 705 provides an alert 707 of the upcoming hazard area and warns the driver/passenger of the AV 107 that "Alert! Upcoming hazard area with a high probability of bicyclists riding outside of the bicycle lane. Preparing to slow down."

Figure 8:
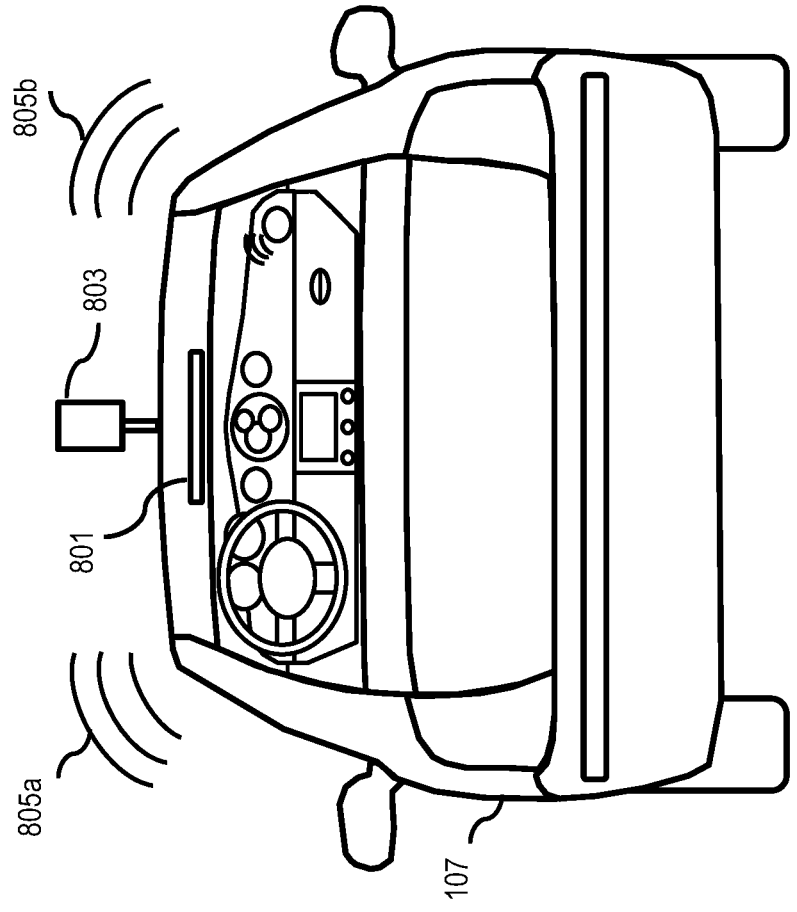
FIG. 8 is a diagram illustrating an example autonomous vehicle with sensors that can be activated based on bicycle lane deviations, according to one embodiment.

In one embodiment, in addition to slowing down, the AV can activate additional sensors to detect potential bicyclists in the road. FIG. 8 is a diagram illustrating an example autonomous vehicle 107 with sensors that can be activated based on bicycle lane deviations, according to one embodiment. As shown, the AV 107 is equipped with a camera sensor 801, a Lidar sensor 803, and an infrared sensors 805a and 805b (also collectively referred to as infrared sensors 805). The Lidar sensor 803 and the infrared sensors 805 are examples of the additional sensors that can be activated to detect potential bicyclists when approaching a bicycle deviation cluster. In a normal mode of operation, the camera sensor 801 is operated continuously as the vehicle travels. Under this normal mode, the Lidar sensor and the infrared sensors 805 are deactivated until the AV 107 detects that its approaching a hazard area with potential bicyclists deviating from bicycling lanes 103.

In one embodiment, the Lidar sensor 803 is a retractable sensor that unretracts when activated. In addition, the Lidar sensor 803 includes a rotating body that spins as the sensor scans the surrounding environment to provide a 360° Lidar image or point cloud. The infrared sensors use an active infrared illumination system to provide improved images and longer range and can be activated or deactivated based on the bicycle deviation data 115.

Figure 9:
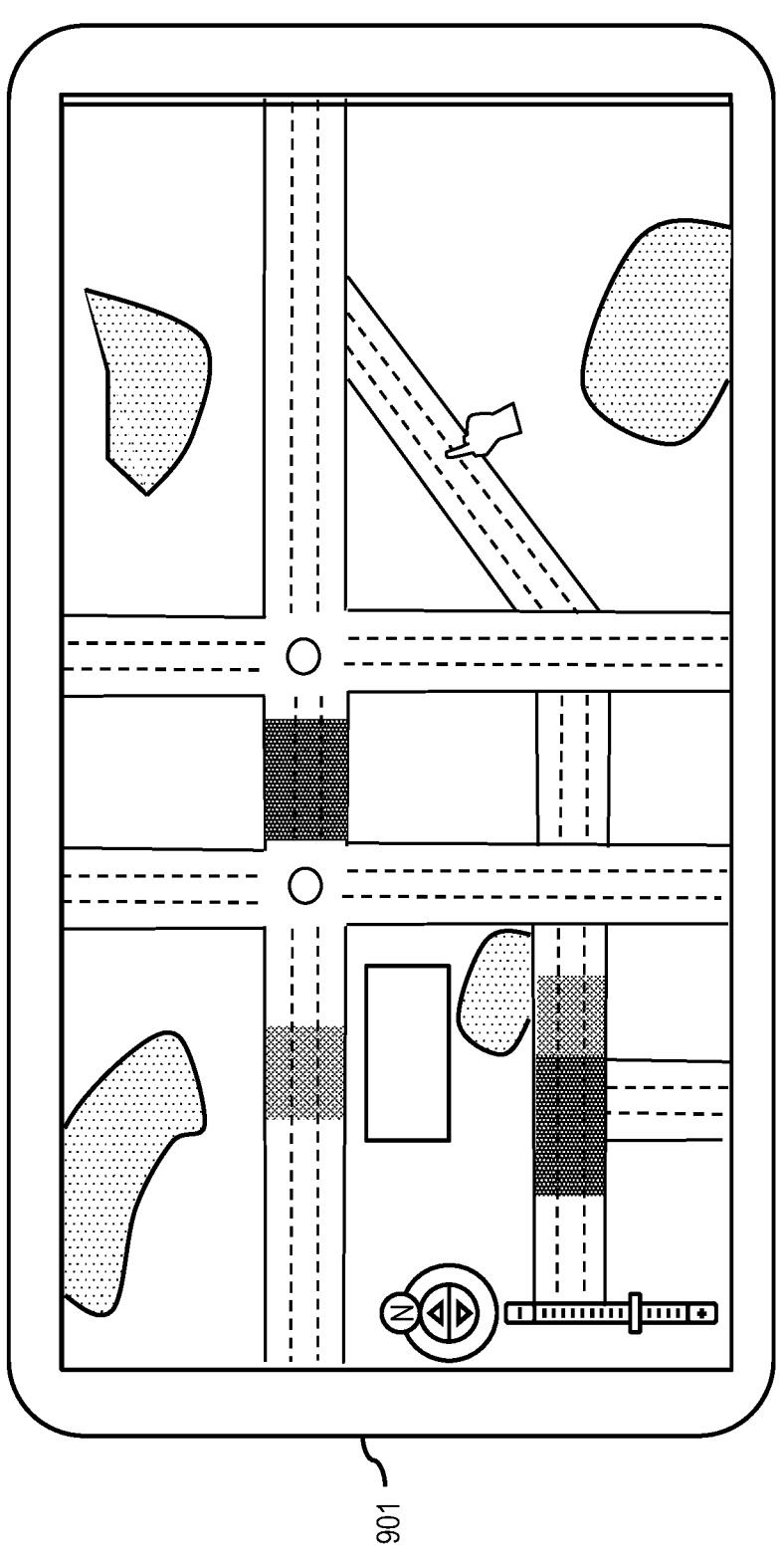
FIG. 9 is a diagram illustrating an example user interface for presenting bicycle lane deviation clusters, according to one embodiment.

In another example use case, the output module 207 can provide data for generating a mapping display presenting a representation of the at least one cluster (e.g., the bicycle deviation data 115). For example, FIG. 9 is a diagram illustrating an example user interface 901 for presenting bicycle lane deviation clusters, according to one embodiment. As shown, the confidence values of the bicyclist deviation associated with locations (e.g., locations or road segments corresponding to bicycle lane deviation clusters) in the road network are shown in the map with different shading or colors such as, but not limited to: (1) green (or no shading) indicating low confidence; (2) amber (or medium shading) indicating medium confidence; and (3) red (or dark shading) indicating high confidence.

In the example of FIG. 9, the mapping platform 119 has collected bicycle probe data 109 over a designated time period from bicycles 105 that have ridden outside of the bicycle lane 104. The probe data 109 is processed to determine location clusters of where bicyclists have deviated outside of the bicycle lane 103. The confidence of the determined location clusters is also calculated along discrete segments (e.g., 5-meter segments or any other designated interval) of the roads in the road network. As shown, the individual discrete segments of the roads are visualized in different shading based the confidence of determined bicycle deviation clusters associated with the respective discrete segments (e.g., shading in proportion of the confidence from no shading to dark shading).

In summary, the various embodiments described herein enable features including but not limited to:

Identification of bicyclist lane deviation hazards for AVs 107 and/or other road users via a lane level map matcher;

AV response to the oncoming bicyclist hazard areas resulting from bicycle lane deviations;

Identification of areas where the confidence of cyclist deviating from the cycle lane is high;

Better city planning by understanding why cyclist are deviating;

Identification of road blockages like roadworks which may cause cycle deviation; and Identification of when the bicycle lane 103 may be too narrow to support bicycle traffic on a given road segment.

For example, with respect to the last two features, the output module 207 can identify a road blockage based on the at least one location cluster or identify that the bicycle lane is narrow based on the at least one cluster and/or its features or characteristics along with the features or characteristics of the underlying road or bicycle lane 103. For example, features such as the size, extent, timing, etc. of a bicycle location cluster may indicate that a bicycle lane blockage caused by events such as construction, vehicle parking in the bicycle lane, etc.

In one embodiment, location-based services and/or applications (e.g., provided by the services platform 123, services 125, and/or content providers 127) can use the bicycle deviation data 115 to provide various functions. For example, as previously discussed, mapping and/or navigation applications can perform functions including but not limited to: (1) displaying such information on the map; (2) routing AVs 107 away from the most dangerous links which have the highest confidence bicycle lane deviations; (3) adapt guidance related information; (4) incentivizing public services (e.g., police) to be present at the most dangerous locations (e.g., to avoid potential accidents involving bicyclists who may be deviating outside of bicycle lanes; (5) simulate bicycle lane deviation hazard areas for urban planners using such collected data; and/or the like.

Returning to FIG. 1, as shown, the system 100 includes the mapping platform 119 for determining a bicycle deviation data 115 using bicycle probe data 109. In one embodiment, the mapping platform 119 has connectivity over the communication network 121 to a services platform 123 that provides one or more services 125 that can use the bicycle deviation data 115 for downstream functions. By way of example, the services 125 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 125 uses the output of the mapping platform 119 (e.g., bicycle deviation data 115, geographic database 117, etc.) to provide services such as navigation, mapping, other location-based services, etc. to the AVs 107, UEs 111, applications 113, and/or other client devices.

In one embodiment, the mapping platform 119 may be a platform with multiple interconnected components. The mapping platform 119 may include multiple servers, intelligent networking devices, computing devices, components, and corresponding software for determining map feature identification confidence levels for a given user according to the various embodiments described herein. In addition, it is noted that the mapping platform 119 may be a separate entity of the system 100, a part of one or more services 125, a part of the services platform 123, or included within components of the AVs 107 and/or UEs 111.

In one embodiment, content providers 127 may provide content or data (e.g., including sensor data such as image data, probe data, related geographic data, etc.) to the geographic database 117, the mapping platform 119, the services platform 123, the services 125, the AVs 107, the UEs 111, and/or the applications 113 executing on the UEs 111. The content provided may be any type of content, such as sensor data, imagery, probe data, machine learning (inference) models, permutations matrices, map embeddings, map content, textual content, audio content, video content, image content, etc. In one embodiment, the content providers 127 may provide content that may aid in determining the bicycle deviation data 115 according to the various embodiments described herein. In one embodiment, the content providers 127 may also store content associated with the geographic database 117, mapping platform 119, services platform 123, services 125, and/or any other component of the system 100. In another embodiment, the content providers 127 may manage access to a central repository of data, and offer a consistent, standard interface to data, such as a repository of the geographic database 117.

In one embodiment, the AVs 107 and/or UEs 111 may execute software applications 113 to use bicycle deviation data 115 or other data derived therefrom according to the embodiments described herein. By way of example, the applications 113 may also be any type of application that is executable on the AVs 107 and/or UEs 111, such as autonomous driving applications, routing applications, mapping applications, location-based service applications, navigation applications, device control applications, content provisioning services, camera/imaging application, media player applications, social networking applications, calendar applications, and the like. In one embodiment, the applications 113 may act as a client for the mapping platform 119 and perform one or more functions associated with determining the bicycle deviation data 115 alone or in combination with the mapping platform 119.

By way of example, the AVs 107 and/or UEs 111 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the AVs 107 and/or UEs 111 can support any type of interface to the user (such as "wearable" circuitry, etc.). In one embodiment, the AVs 107 and/or UEs 111 may be associated with or be a component of a vehicle or any other device.

In one embodiment, the AVs 107 and/or UEs 111 are configured with various sensors for generating or collecting probe data, related geographic data, etc. In one embodiment, the sensed data represent sensor data associated with a geographic location or coordinates at which the sensor data was collected, and the polyline or polygonal representations of detected objects of interest derived therefrom to generate the digital map data of the geographic database 117. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the AVs 107 and/or UEs 111 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the AVs 107 and/or UEs 111 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the AVs 107 and/or UEs 111 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 119, services platform 123, services 125, AVs 107 and/or UEs 111, and/or content providers 127 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
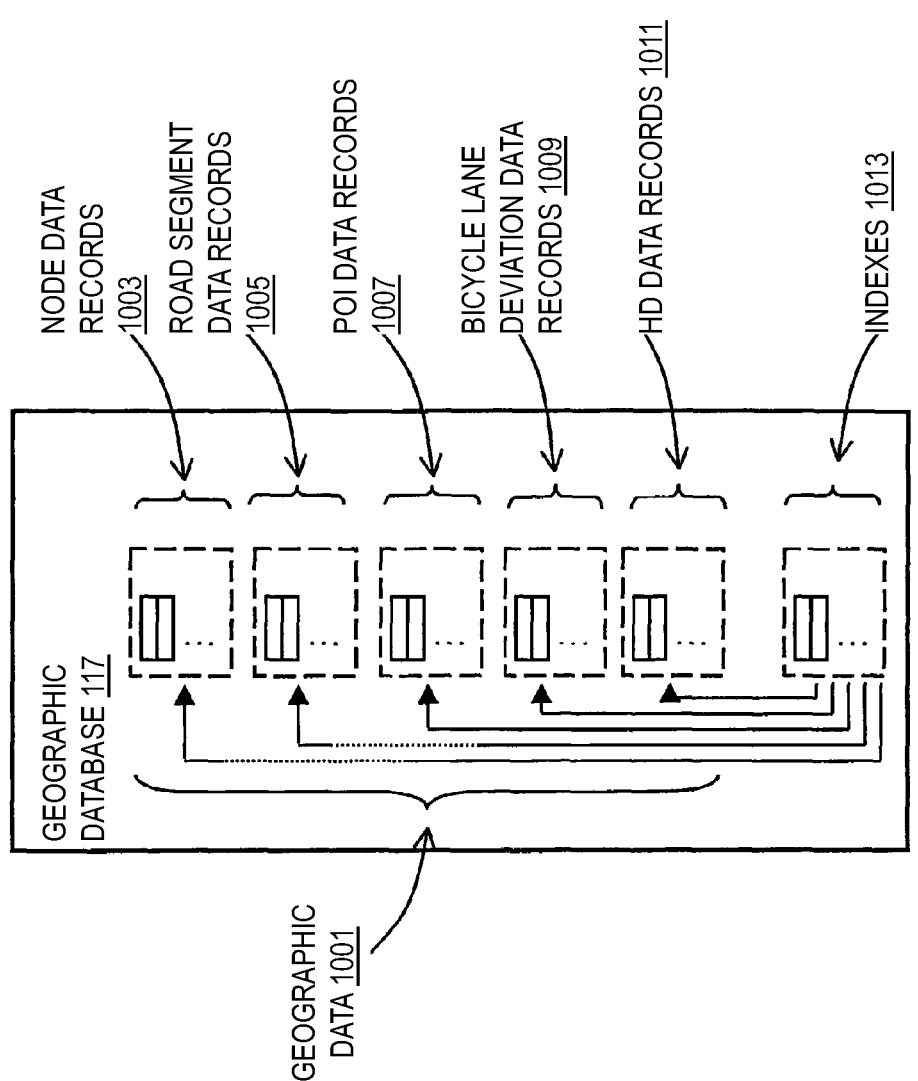
FIG. 10 is a diagram of a geographic database, according to one embodiment.

FIG. 10 is a diagram of a geographic database 117, according to one embodiment. In one embodiment, the geographic database 117 includes geographic data 1001 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1001. In one embodiment, the geographic database 117 include high definition (HD) mapping data that provide centimeter-level or better accuracy of map features. For example, the geographic database 117 can be based on Light Detection and Ranging (LiDAR) or equivalent technology to collect billions of 3D points and model road surfaces and other map features down to the number lanes and their widths. In one embodiment, the HD mapping data (e.g., HD data records 1011) and/or other mapping data of the geographic database 117 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 1003, road segment or link data records 1005, POI data records 1007, bicycle lane deviation data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 117. In one embodiment, the indexes 1013 may be used to quickly locate data without having to search every row in the geographic database 117 every time it is accessed. For example, in one embodiment, the indexes 1013 can be a spatial index of the polygon points associated with stored feature polygons. In one or more embodiments, data of a data record may be attributes of another data record.

In exemplary embodiments, the road segment data records 1005 are links or segments representing roads, streets, paths, or bicycle lanes, as can be used in the calculated route or recorded route information for determination of speed profile data. The node data records 1003 are end points (for example, representing intersections or an end of a road) corresponding to the respective links or segments of the road segment data records 1005. The road link data records 1005 and the node data records 1003 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 1007. The geographic database 117 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 117 can also include bicycle lane disruption data records 1009 for storing the bicycle deviation data 115, bicycle probe data 109, trained machine learning (inference) models, and/or any other related data that is used or generated according to the embodiments described herein. By way of example, the bicycle lane deviation records 1009 can be associated with one or more of the node records 1003, road segment records 1005, and/or POI data records 1007 to associate the speed profile data records 1009 with specific places, POIs, geographic areas, and/or other map features. In this way, the linearized data records 1009 can also be associated with the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1011 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 117 can be maintained by the content provider 127 in association with the mapping platform 119 (e.g., a map developer or service provider). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by AVs 107 and/or UEs 111. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining bicycle lane deviations for autonomous vehicle operation and/or warning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
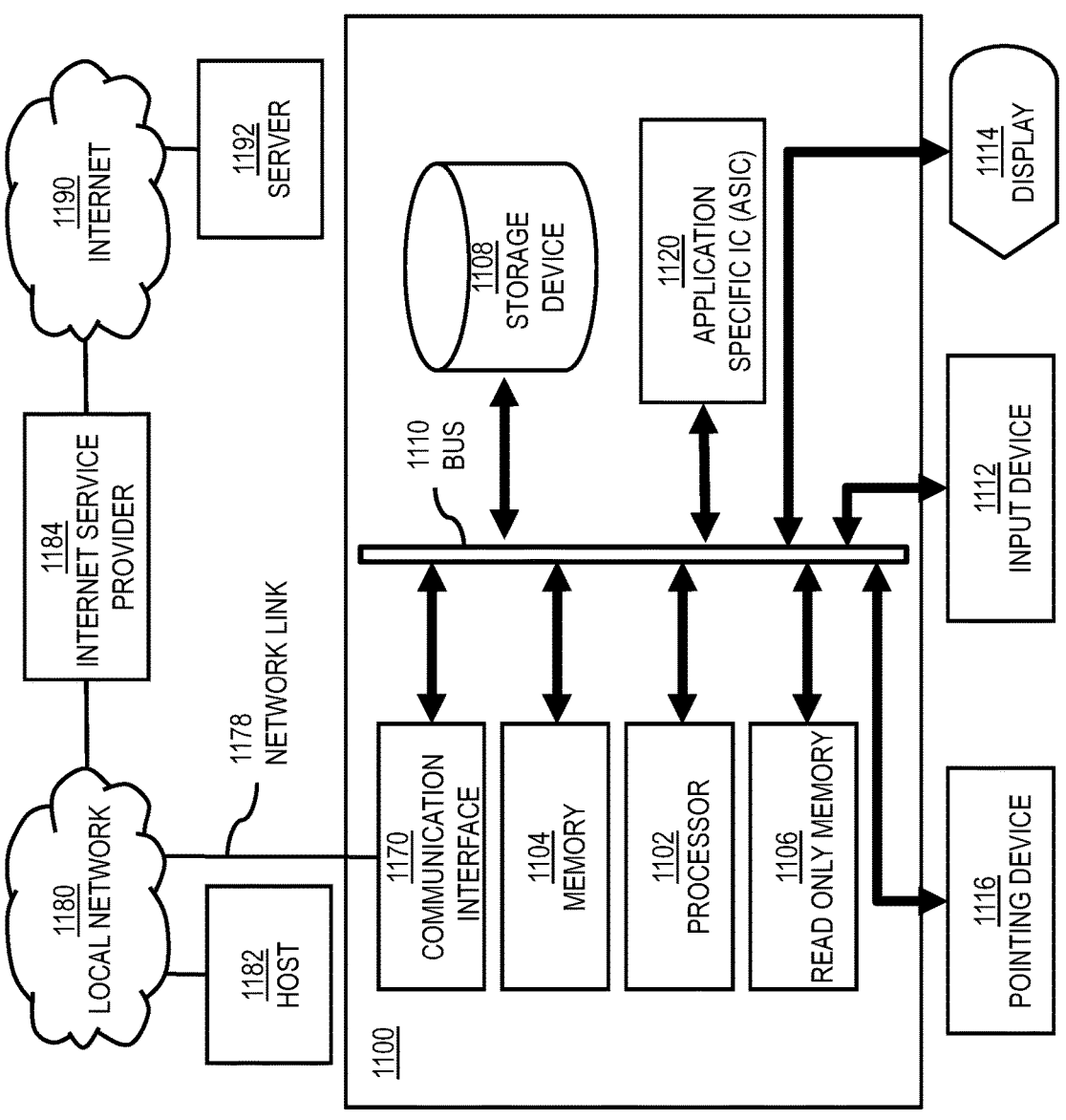
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to determine bicycle lane deviations for autonomous vehicle operation and/or warning as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to determining bicycle lane deviations for autonomous vehicle operation and/or warning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RANI) or other dynamic storage device, stores information including processor instructions for determining bicycle lane deviations for autonomous vehicle operation and/or warning. Dynamic memory allows information stored therein to be changed by the computer system 1100. RANI allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining bicycle lane deviations for autonomous vehicle operation and/or warning, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 121 for determining bicycle lane deviations for autonomous vehicle operation and/or warning.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to determine bicycle lane deviations for autonomous vehicle operation and/or warning as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine bicycle lane deviations for autonomous vehicle operation and/or warning. The memory 1205 also stores the data associated with or generated by the execution of the inventive steps.

Figure 13:
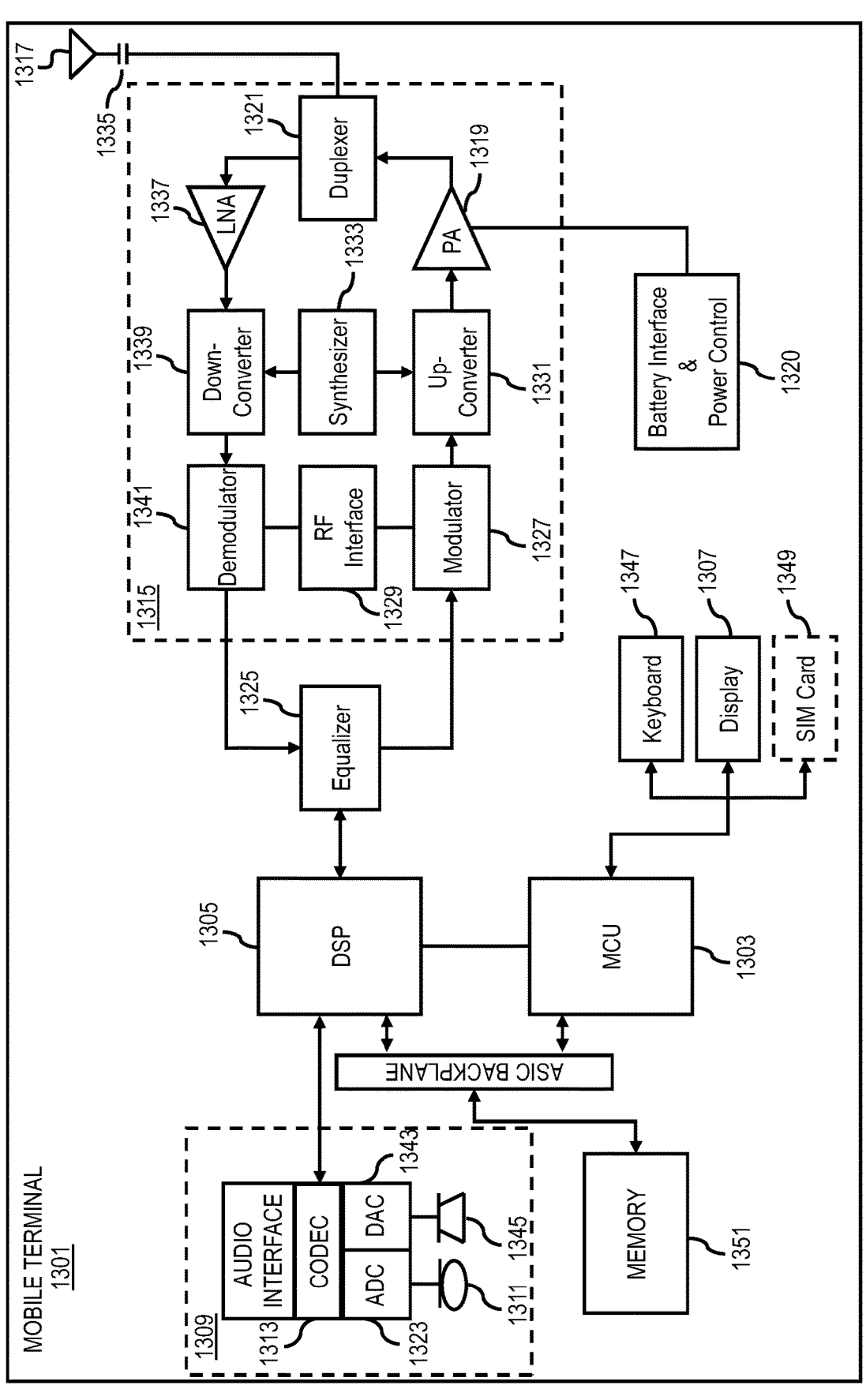
FIG. 13 is a diagram of a mobile terminal (e.g., handset or vehicle or part thereof) that can be used to implement an embodiment.

FIG. 13 is a diagram of exemplary components of a mobile terminal (e.g., AV 107, UE 111, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the micro-phone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to determine bicycle lane deviations for autonomous vehicle operation and/or warning. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
retrieving probe data associated with a bicycle transportation mode;
determining a plurality of probe points of the probe data that are map-matched outside of a bicycle lane;
clustering the plurality of probe points into at least one location cluster based on a clustering model configured to cluster archived probe points or selected probe points of the plurality of probe points for determining one or more geographic areas where a plurality of bicycles are not staying in a given bicycle lane, wherein the clustering model is configured to use a sliding window for selection of the archived probe points;
storing the one or more location clusters in a geographic database as respective one or more hazard areas where a plurality of bicycles deviates outside of the bicycle lane;
determining a confidence level of bicycle deviations for each of the one or more location clusters in the geographic databases based on a spatial relationship of the one or more location clusters to one or more bicycle lanes;
determining a likelihood that a vehicle along a route is approaching the one or more location clusters; and
providing an output signal for activation of one or more sensors coupled to the vehicle prior to the vehicle approaching the one or more location clusters and the determined confidence level, wherein activation of the one or more sensors includes one or more instructions to unretract a laser-based distance sensor from a retracted position to an unretracted position that enables the laser-based distance sensor to scan an area corresponding to the one or more location clusters.

2. The method of claim 1, further comprising:
using the at least one location cluster to perform at least one of:
providing a warning message; or
determining a driving parameter for an autonomous vehicle.

3. The method of claim 1, further comprising:
determining a confidence of bicycle deviations based on a location of the at least one location cluster with respect to the bicycle lane.

4. The method of claim 3, wherein the confidence of bicycle deviations is set to:
a low confidence based on determining there is no location cluster;
a medium confidence based on determining that the at least one cluster is located partially within the bicycle lane and partially outside the bicycle lane; or
a high confidence based on determining that the at least one location cluster is located completely outside the bicycle lane.

5. The method of claim 4, further comprising:
determining an autonomous vehicle driving response to approaching the at least one location cluster based on the confidence of bicycle deviations.

6. The method of claim 5, wherein the driving response is to move to another vehicle lane, to reduce vehicle speed, to engage a sensor to detect a bicyclist, or a combination thereof.

7. The method of claim 1, wherein the clustering is performed based on a specified minimum number of probe points, a specified distance radius, or a combination thereof.

8. The method of claim 1, further comprising:
providing data for generating a mapping display presenting a representation of the at least one cluster.

9. The method of claim 1, further comprising:
identifying a road blockage based on the at least one location cluster.

10. The method of claim 1, further comprising:
identifying that the bicycle lane is narrow based on the at least one cluster.

11. An apparatus comprising:
at least one processor; and
at least one memory including computer program code for one or more programs, the at least one memory and the computer program code configured to, with the at least one processor, cause the apparatus to perform at least the following, retrieve probe data associated with a bicycle transportation mode;
determine a plurality of probe points of the probe data that are map-matched outside of a bicycle lane;
cluster the plurality of probe points into at least one location cluster based on a clustering model configured to cluster archived probe points or selected probe points of the plurality of probe points for determining one or more geographic areas where a plurality of bicycles are not staying in a given bicycle lane, wherein the clustering model is configured to use a sliding window for selection of the archived probe points;
store the one or more location clusters in a geographic database as respective one or more hazard areas where a plurality of bicycles deviates outside of the bicycle lane;
determine a confidence level of bicycle deviations for each of the one or more location clusters in the geographic databases based on a spatial relationship of the one or more location clusters to one or more bicycle lanes;
determine a likelihood that a vehicle along a route is approaching the one or more location clusters; and
provide an output signal for activation of one or more sensors coupled to the vehicle prior to the vehicle approaching the one or more location clusters and the determined confidence level, wherein activation of the one or more sensors includes one or more instructions to unretract a laser-based distance sensor from a retracted position to an unretracted position that enables the laser-based distance sensor to scan an area corresponding to the one or more location clusters.

12. The apparatus of claim 11, wherein the apparatus is further caused to:

use the at least one location to perform at least one of:

providing a warning message; or determining a driving parameter for an autonomous vehicle.

13. The apparatus of claim 11, wherein the apparatus is further caused to:

determine a confidence of bicycle deviations based on a location of the at least one location cluster with respect to the bicycle lane.

14. The apparatus of claim 13, wherein the confidence of bicycle deviations is set to:

a low confidence based on determining there is no location cluster;

a medium confidence based on determining that the at least one cluster is located partially within the bicycle lane and partially outside the bicycle lane; or a high confidence based on determining that the at least one location cluster is located completely outside the bicycle lane.

15. The apparatus of claim 14, wherein the apparatus is further caused to:

determine an autonomous vehicle driving response to approaching the at least one location cluster based on the confidence of bicycle deviations.

16. A non-transitory computer-readable storage medium carrying one or more sequences of one or more instructions which, when executed by one or more processors, cause an apparatus to perform:

retrieving probe data associated with a bicycle transportation mode;

determining a plurality of probe points of the probe data that are map-matched outside of a bicycle lane;

clustering the plurality of probe points into at least one location cluster based on a clustering model configured to cluster archived probe points or selected probe points of the plurality of probe points for determining one or more geographic areas where a plurality of bicycles are not staying in a given bicycle lane, wherein the clustering model is configured to use a sliding window for selection of the archived probe points;

storing the one or more location clusters in a geographic database as respective one or more hazard areas where a plurality of bicycles deviates outside of the bicycle lane;

determining a confidence level of bicycle deviations for each of the one or more location clusters in the geographic databases based on a spatial relationship of the one or more location clusters to one or more bicycle lanes;

determining a likelihood that a vehicle along a route is approaching the one or more location clusters; and providing an output signal for activation of one or more sensors coupled to the vehicle prior to the vehicle approaching the one or more location clusters and the determined confidence level, wherein activation of the one or more sensors includes one or more instructions to unretract a laser-based distance sensor from a retracted position to an unretracted position that enables the laser-based distance sensor to scan an area corresponding to the one or more location clusters.

17. The non-transitory computer-readable storage medium of claim 16, wherein the apparatus is caused to further perform:

using the at least one location to perform at least one of:

providing a warning message; or determining a driving parameter for an autonomous vehicle.

18. The non-transitory computer-readable storage medium of claim 16, wherein the apparatus is caused to further perform:

determining a confidence of bicycle deviations based on a location of the at least one location cluster with respect to the bicycle lane.

19. The non-transitory computer-readable storage medium of claim 18, wherein the confidence of bicycle deviations is set to:

a low confidence based on determining there is no location cluster;

a medium confidence based on determining that the at least one cluster is located partially within the bicycle lane and partially outside the bicycle lane; or a high confidence based on determining that the at least one location cluster is located completely outside the bicycle lane.

20. The non-transitory computer-readable storage medium of claim 19, wherein the apparatus is caused to further perform:

determining an autonomous vehicle driving response to approaching the at least one location cluster based on the confidence of bicycle deviations.

* * * * *